US012423676B1

(12) United States Patent
Brooks

(10) Patent No.: US 12,423,676 B1
(45) Date of Patent: Sep. 23, 2025

(54) SYSTEMS AND METHODS FOR INDIVIDUAL POTENTIAL TOKENIZATION AND EXCHANGE

(71) Applicant: Quiddity Systems, Inc., Zionsville, IN (US)

(72) Inventor: Paul Brooks, Zionsville, IN (US)

(73) Assignee: Quiddity Systems, Inc., Zionsville, IN (US)

( * ) Notice: Subject to any disclaimer, the term of this patent is extended or adjusted under 35 U.S.C. 154(b) by 397 days.

(21) Appl. No.: 18/117,177

(22) Filed: Mar. 3, 2023

Related U.S. Application Data

(60) Provisional application No. 63/317,293, filed on Mar. 7, 2022.

(51) Int. Cl.
 *G06Q 20/36* (2012.01)
 *G06Q 20/12* (2012.01)

(52) U.S. Cl.
 CPC ..... *G06Q 20/363* (2013.01); *G06F 2212/178* (2013.01); *G06Q 20/1235* (2013.01); *G06Q 2220/00* (2013.01)

(58) Field of Classification Search
 None
 See application file for complete search history.

(56) References Cited

U.S. PATENT DOCUMENTS

| | | | |
|---|---|---|---|
| 5,809,484 A | 9/1998 | Mottola et al. | |
| 10,650,456 B2 | 5/2020 | Al-Masoud | |
| 10,672,076 B2 | 6/2020 | Pillai | |
| 2003/0018571 A1 | 1/2003 | Eckert et al. | |
| 2010/0004957 A1 | 1/2010 | Ball | |
| 2015/0317602 A1* | 11/2015 | Rao | G06Q 10/1053 705/321 |
| 2020/0067697 A1* | 2/2020 | Puddu | G06Q 20/382 |
| 2023/0186291 A1* | 6/2023 | Haddad | G06Q 20/363 705/64 |

OTHER PUBLICATIONS

Wink, Christopher, "What could DAOs mean for HR?" [online] technical.ly, available at: < https://technical.ly/company-culture/decentralized-autonomous-organizations-hr/ > published on Mar. 15, 2021 (Year: 2021).*

* cited by examiner

*Primary Examiner* — Richard W. Crandall
(74) *Attorney, Agent, or Firm* — NEO IP

(57) ABSTRACT

The present invention is directed to a distributed ledger-based platform for buying and selling tokens representative of a person's value creation potential. Tokens represent both intrinsic and talent-based value creation potential. In one embodiment, a productivity identity is associated with a user account of the platform based on attributes attributing to the user's value creation potential by at least one non-fungible token (NFT) which links the productivity identifier to a user account's cryptocurrency wallet. In one embodiment, user accounts of the platform are further placed into a decentralized autonomous organization (DAO).

20 Claims, 5 Drawing Sheets

SYSTEMS AND METHODS FOR INDIVIDUAL POTENTIAL TOKENIZATION AND EXCHANGE

CROSS REFERENCE TO OTHER APPLICATIONS

This application is related to and claims priority from the following U.S. patents and patent applications. This application claims priority to and the benefit of U.S. Provisional Application No. 63/317,293, filed Mar. 7, 2022, which is incorporated herein by reference in its entirety.

BACKGROUND OF THE INVENTION

1. Field of the Invention

The present invention relates to a system for creating tangible assets out of "acquired" assets and "potential" assets that can be titled by combining an algorithmic unique data structure called PRODUCTIVE IDENTITY and using the blockchain incorporating TALENT and INTRINSIQ tokenization, and more specifically to establish value creation attributes of individuals and tokenizing a PRODUCTIVE IDENTITY consisting of these attributes.

2. Description of the Prior Art

It is generally known in the prior art to provide income share agreements (ISAs) for an individual as a means to generate the capital needed for large, upfront investments such as education or vocational training.

Prior art patent documents include the following:

US Patent Pub. No. 2010/0004957 for Interactive system and methods for insurance-related activities by inventor Ball, filed Feb. 27, 2009, and published Jan. 7, 2010, is directed to systems and methods for performing insurance related activities. Software can be implemented to provide an application that includes an interactive interface for use by insurance professionals in managing clients. Personal data can be received for computing a client's financial condition. Business data of the client can be received for computing a business financial condition of the business at the death of the client. An assumption of the business financial condition, including levels of business owned life insurance can be modified. A selection mechanism can also be provided, which when selected displays a representation of a death benefits to the client and to the business, based on the modified assumption. The personal financial and business financial condition can change in relation to a change in the personal death and business death benefit as the assumptions are interactively modified, thereby showing the benefit of business owned life insurance.

US Patent Pub. No. 2003/0018571 for System and method of trading securities based on the income of a performer by inventors Eckert, et al., filed Jun. 14, 2002, and published Jan. 23, 2003, is directed to a method of trading a security that is based on the prospective income of a performer includes selling one or more security instruments to a plurality of owners, each security instrument having a value based on the prospective income of a performer. The method further includes providing a secondary trading period in which at least one of the plurality of owners offers to sell at least one security instrument to one or more market buyers. Preferably, a plurality of secondary trading periods are provided, with successive secondary trading periods separated by a plurality of days.

U.S. Pat. No. 5,809,484 for Method and apparatus for funding education by acquiring shares of students' future earnings by inventors Mottola, et al., filed May 24, 1995, and issued Sep. 15, 1998, is directed to a data processing system and method for administering a plan for funding investments in education is provided. The education investment plan includes a unit investment trust for financing the educations of a predetermined number of students pursuing careers in preselected fields of study. The data processing system selects students for participation in the plan by comparing their application responses in various categories, weighted according to a predetermined weighting scheme, to stored weighted criteria for the same categories. The education of accepted students is paid for by funds invested in the plan by investors. The students agree to assign a percentage of their future income for a limited time period to the plan, generating a return for the investors. Students are monitored throughout their education and employment until their obligations are discharged, with the results of the monitoring used to adjust, as necessary, the acceptance criteria. In order to offer the plan, plan earnings are projected based on multiple variables, and the projection may be performed according to statistical equations, or may be performed iteratively with a different variable varied during each iteration.

U.S. Pat. No. 10,672,076 for System and method for calculating prospective return on investment of academic persons in return for future income-based revenue sharing by inventor Pillai, filed Feb. 25, 2015, and issued Jun. 2, 2020, is directed to a method for investing in student debt based on a specific student candidate's predicted future earnings which comprises the steps of assessing information stored in a database relating to an academic program in which the student is, was or will be enrolled in, assessing the student's academic, professional and economic potential based on information stored in a database relating to qualifications, and combining the assessments of the academic program and the student's potential to create a metric represents the desirability of the student's debt as an investment. The method is preferably executed by a computer program installed in a computer having a processor and a memory where the computer is able to store data relating to an assessment of the said academic program as well as the specific student's credentials.

U.S. Pat. No. 10,650,456 for Systems and methods for managing a talent based exchange by inventor Al-Masoud, filed Jan. 20, 2017, and issued May 12, 2020, is directed to creating a process and system that manages integration of securitization elements into tradable stocks, trading and execution of the stocks, and the generation of the underlying instruments that link a Talented Person's earning potential backed by one or more insurance policies to a tradable stock. The tradable stock itself is a unique technologically based digital object. The digital object is configured to encode various elements of the Talent's profile, encode securitization elements, and encode ownership and/or encode transaction histories within the digital object. The encoding is configured such that any owner, purchaser, or other party can validate the digital object based on the included encoding. Further, records of digital stock information and digital stock transactions can be distributed to users of the system via distributed ledger technology.

SUMMARY OF THE INVENTION

The present invention relates to unlocking and unleashing human value creation potential.

It is an object of this invention to provide a platform that is operable to unlock and unleash human value creation potential by utilizing unique forms of data organization in combination with blockchain technologies.

In one embodiment, the present invention is directed to a system for value creation based on individual future productivity, including a server platform, including a processor and a memory, in network communication with at least one user device, wherein the server platform is operable to receive personal information concerning at least one user from the at least one user device and/or from at least one external data source, wherein the personal information includes education history, employment history, language proficiency, skill proficiency, and/or one or more personal connections, of the at least one user, wherein the server platform calculates a human life value for the at least one user based on the personal information received from the at least one user device and/or the at least one external data source, wherein the server platform automatically mints at least one non-fungible identity token corresponding to the at least one user, and wherein creation of the at least one non-fungible identity token is recorded on at least one distributed ledger, wherein the at least one non-fungible identity token is stored in at least one digital wallet associated with the at least one user, and wherein the at least one non-fungible identity token provides membership and voting rights in at least one distributed autonomous organization (DAO).

In another embodiment, the present invention is directed to a system for value creation based on individual future productivity, including a server platform, including a processor and a memory, in network communication with at least one user device, wherein the server platform is operable to receive personal information concerning at least one user from the at least one user device and/or from at least one external data source, wherein the server platform calculates a human life value for the at least one user based on the personal information received from the at least one user device and/or the at least one external data source, wherein the server platform automatically mints at least one non-fungible identity token corresponding to the at least one user, and wherein creation of the at least one non-fungible identity token is recorded on at least one distributed ledger, wherein the server platform automatically mints one or more talent tokens corresponding to the at least one user based on the calculated human life value, wherein the at least one non-fungible identity token is stored in at least one digital wallet associated with the at least one user, and wherein the at least one non-fungible identity token provides membership and voting rights in at least one distributed autonomous organization (DAO).

In yet another embodiment, the present invention is directed to a system for value creation based on individual future productivity, including a server platform, including a processor and a memory, in network communication with at least one user device, wherein the server platform is operable to receive personal information concerning at least one user from the at least one user device and/or from at least one external data source, wherein the server platform includes a web crawler module operable to automatically retrieve online personal information regarding the at least one user, wherein the server platform calculates a human life value for the at least one user based on the personal information received from the at least one user device and/or the at least one external data source, wherein the server platform automatically mints at least one non-fungible identity token corresponding to the at least one user, and wherein creation of the at least one non-fungible identity token is recorded on at least one distributed ledger, wherein the at least one non-fungible identity token is stored in at least one digital wallet associated with the at least one user, and wherein the at least one non-fungible identity token provides membership and voting rights in at least one distributed autonomous organization (DAO).

These and other aspects of the present invention will become apparent to those skilled in the art after a reading of the following description of the preferred embodiment when considered with the drawings, as they support the claimed invention.

DETAILED DESCRIPTION

Figure 1:
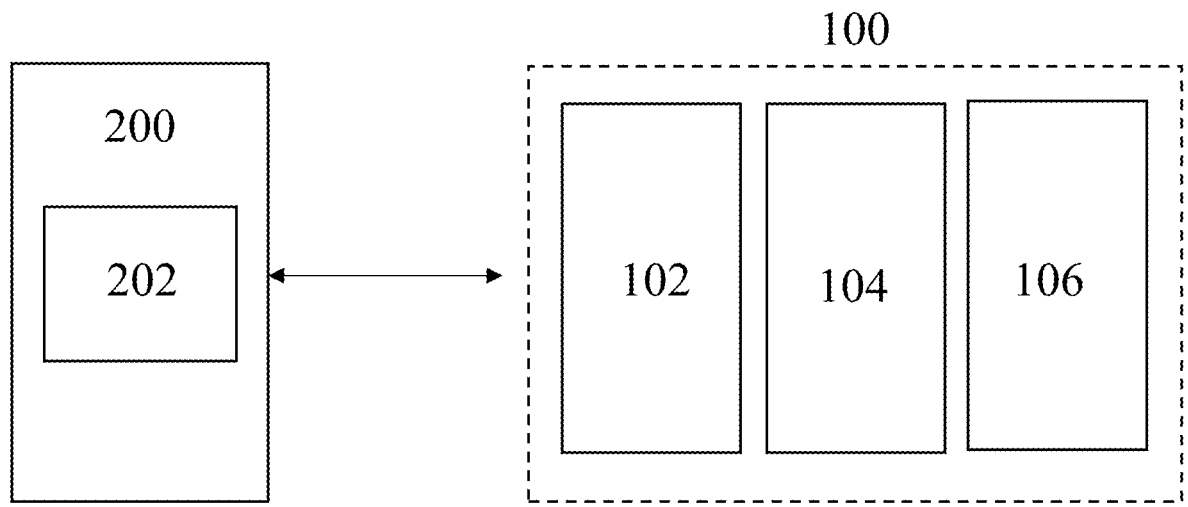
FIG. 1 illustrates a block diagram of a system of the present invention.

The present invention is generally related to unlocking and unleashing human value creation potential through the implementation of a distributed ledger-based platform and novel methods for the organization of data relating to human life value-based assets.

In one embodiment, the present invention is directed to a system for value creation based on individual future productivity, including a server platform, including a processor and a memory, in network communication with at least one user device, wherein the server platform is operable to receive personal information concerning at least one user from the at least one user device and/or from at least one external data source, wherein the personal information includes education history, employment history, language proficiency, skill proficiency, and/or one or more personal connections, of the at least one user, wherein the server platform calculates a human life value for the at least one user based on the personal information received from the at least one user device and/or the at least one external data source, wherein the server platform automatically mints at least one non-fungible identity token corresponding to the at least one user, and wherein creation of the at least one non-fungible identity token is recorded on at least one distributed ledger, wherein the at least one non-fungible identity token is stored in at least one digital wallet associated with the at least one user, and wherein the at least one non-fungible identity token provides membership and voting rights in at least one distributed autonomous organization (DAO).

In another embodiment, the present invention is directed to a system for value creation based on individual future productivity, including a server platform, including a processor and a memory, in network communication with at least one user device, wherein the server platform is operable to receive personal information concerning at least one user from the at least one user device and/or from at least one external data source, wherein the server platform calculates a human life value for the at least one user based on the personal information received from the at least one user device and/or the at least one external data source, wherein the server platform automatically mints at least one non-fungible identity token corresponding to the at least one user, and wherein creation of the at least one non-fungible identity token is recorded on at least one distributed ledger, wherein the server platform automatically mints one or more talent tokens corresponding to the at least one user based on the calculated human life value, wherein the at least one non-fungible identity token is stored in at least one digital wallet associated with the at least one user, and wherein the at least one non-fungible identity token provides membership and voting rights in at least one distributed autonomous organization (DAO).

In yet another embodiment, the present invention is directed to a system for value creation based on individual future productivity, including a server platform, including a processor and a memory, in network communication with at least one user device, wherein the server platform is operable to receive personal information concerning at least one user from the at least one user device and/or from at least one external data source, wherein the server platform includes a web crawler module operable to automatically retrieve online personal information regarding the at least one user, wherein the server platform calculates a human life value for the at least one user based on the personal information received from the at least one user device and/or the at least one external data source, wherein the server platform automatically mints at least one non-fungible identity token corresponding to the at least one user, and wherein creation of the at least one non-fungible identity token is recorded on at least one distributed ledger, wherein the at least one non-fungible identity token is stored in at least one digital wallet associated with the at least one user, and wherein the at least one non-fungible identity token provides membership and voting rights in at least one distributed autonomous organization (DAO).

None of the prior art discloses a platform for individuals operable to provide liquidity for value creation potential through the distribution and trading of tokens representative of human life value-based value creation capability and the potential and operable to collect, identify, and organize data relating to an individual's human life value characteristics to facilitate and accelerate the production of new and potential value creation ventures and personal development.

Life insurance has long been used to provide liquidity to families of individuals following the loss of life and/or time that cause subsequent loss of value creation. However, this model fails to address issues arising from the use of time in individuals that do not suffer a loss of time incident. For these individuals, there exist few options to provide liquidity for value-creating abilities and characteristics and an equivalent need for a support system to aid in optimizing the use of time to maximize value creation attributes. Therefore, there exists a need to provide liquidity for such individuals along with a platform to support growth in value creation potential.

Historically, life insurance companies have defined an individual's human life value (HLV) as the value of all future earnings for an individual's life discounted back to the day of calculation of the HLV date minus the cost of living for the individual aggregated and discounted back to the day of calculation of the HLV. Further, this value is typically stagnant and is rarely re-calculated for an individual. HLV is typically calculated by multiplying an individual's salary by the number of years they are expected to work before retirement. Other prior art determinations, such as the value of statistical life (VSL) used by government agencies, are also known. However, these measures fail to address the concept of a person's unique capability to create value, considering everyone's capabilities are different and a true measure of value-creation potential includes a variety of non-traditional value metrics. Additionally, traditional HLV measurement practices do not define and value the intangible attributes of an individual linked to value production. Similarly, as society continues to shift towards a decentralized society where typical pay structures such as salaried positions are used less frequently, this metric will continue decreasing in utility to the point where it lacks the depth needed to maintain utility. Take for example, and not limitation, a social media influencer or a freelance developer. Typical HLV measurement is likely to fail to truly express the value creation potential of such individuals considering different things like inconsistency in income and rapid growth potential. Additionally, while social media websites such as LINKEDIN and freelance websites such as FREELANCER provide for discovering and connecting with people offering their talents, these websites do not offer a quantified measurement of the various talents offered by these people and in no cases do they aggregate more than P2P connections. Therefore, there exists a need to alter the ways an individual's HLV is assessed and represented. In particular, there is a longstanding, unmet need in the art for a system which quantifies and organizes productive identity in a standardized format and provides for real-time transactions based on the standardized format for quantifying and organizing productive identity. Further, there exists a need to provide dynamic updates to the HLV of an individual as the individual learns new skills, makes new connections, and acquires additional value creation capabilities which impact the individual's HLV. Additionally, there is a need to create a tangible asset in the form of data from an individual's intangible assets such as human life value-based value creation capabilities.

The present invention provides a novel definition of human life value data in a standardized format using the PRODUCTIVE IDENTITY data structure and enables monetization of human life value through an online infrastructure operated by a decentralized autonomous organization enabling tokenization of a representation of human life value, representation of a user account through an NFT to establish the property of a PRODUCTIVE IDENTITY data structure, and collaboration with other user accounts through a searchable directory of user accounts. The present invention accordingly enables individuals to access liquidity from their existing value creation capability and optimize their use of time to increase personal and collaborative value creation potentials. The present invention is advantageous over prior art as it provides human life value-based value creation identity, human life value property, and access to liquidity for all individuals while the individual is still alive and provides a support system to aid them in finding new value creation ventures and developing additional value creation capabilities. More specifically, the present invention provides systems and methods enabling accounts to trade tokens representative of their HLV on a distributed ledger. The present invention also provides an token system to each user account. This token system, in combination with the non-tradable non-fungible token (NFT) linked to the PRODUCTIVE IDENTITY, provides technological improvements to use of blockchain and NFT technology, enabling novel uses of NFTs and cryptocurrency for a variety of applications, including creating a network for value creation allowing individuals and collaborations of individuals to harness previously unseen levels of value creation potential.

Furthermore, the platform uniquely establishes, through historical, scientific, evidence based, and proprietary algorithm and instruments, a means for the first time, to algorithmically extract a value for the existing state of HLV and accelerate innovation and value creation by this means.

By uniquely defining, calculating, and organizing human life value, the platform provides unprecedented access to operationalize existing HLV, thus revolutionizing society by means of enabling the quantification of HLV, the standardization of a metric of HLV, the monetization of HLV, and the optimization of value creation by accelerating the robust, predictive, and precise identification of the constellation of individuals ideal for a pre-defined outcomes, job, or service opportunities. There is no existing platform that enables iterative innovation and value multiplication through collaboration across disparate "stranger" populations in search of members for predefined outcomes, jobs, and/or services.

A combination of standard validated market assessment tools and unique intellectual property constructs merge algorithmically to operationalize and extract the novel concept of QUIDDITY human life value (QHLV). By means of at least one application program interface (API), third party data and globally recognized assessment tools and databases enables participants to obtain a unique PRODUCTIVE IDENTITY that is unrepeatable and unique past 10 billion. This proprietary process creates liquidity for all whom participate.

Once the individual QHLV is extracted and organized, a unique search and match functionality enables the formation of collaborative teams algorithmically across this precise construct. Before the present invention, this has not been done utilizing a validated and full measure of HLV. This also has not been done universally (across organizations, industries, sectors, nations), and the need for a mechanism for Decentralized Autonomous Organizations (DAOs) to gather a team through a validated and robust search and match functionality that happens via secure blockchain methodology has not been accomplished.

The platform associates a PRODUCTIVE IDENTITY with a user account, assessing data points assembled from the user's input. These data, assembled from a combination of standardized, statistically validated and publicly available assessments, databases, and artifact repositories and our own unique proprietary assessments are merged algorithmically to forge the user's sovereign PRODUCTIVE IDENTITY, unique to 10 billion individuals. An individual PRODUCTIVE IDENTITY profile establishes the foundation upon which the majority of that individual's QHLV is determined, in much the way that a DNA profile defines and describes physical existence.

Further disclosed are components of PRODUCTIVE IDENTITY that the platform uniquely pulls together to first operationalize and subsequently value one's HLV-based asset base. For the initial onboarding into the platform, users participate in a unique systematic audit process where data are collected through a series of surveys.

In further embodiments, user accounts are operable to further be associated with virtual renderings of a user account known as a Quidditar that serves a digital embodiment of the PRODUCTIVE IDENTITY. The Quidditar is further operable to include digital attributes to visualize the QUIDDITY data associated with the user account and stored in the PRODUCTIVE IDENTITY. Advantageously, this allows for quick and easy identification of QHLV and PRODUCTIVE IDENTITY characteristic unlike anything prior. In one embodiment, the Quidditar is used to interact in a virtual environment/metaverse associated with the platform.

An individual in one embodiment of the present invention is a person who possesses the ability to create value and/or make money, therefore possessing a value creation potential. This value creation capability is a culmination of an individual's value creation attributes (e.g., characteristics of an individual that allow them to create value). Individuals are further capable of taking part in value creation ventures. Value creation ventures created on the platform that are opportunities, collaborations, and other situations wherein an individual creates value and/or makes money.

Referring now to the drawings in general, the illustrations are for the purpose of describing one or more preferred embodiments of the invention and are not intended to limit the invention thereto.

FIG. 1 illustrates a block diagram of a system of the present invention. In one embodiment, the present invention includes at least one platform 100, wherein the at least one platform includes a data collection engine 102, a plurality of user accounts 104, and/or a marketplace for digital tokens 106. In one embodiment, the platform 100 is in communication with at least one remote device 200. In one embodiment, the platform is operable to be accessed using an application 202 on a remote device 200 associated with a user account. The application 202 is further operable to provide a graphical user interface (GUI) to the remote device 200 to allow the user account to interact with the platform through the remote device 200. In one embodiment, the platform is operable to run on a server including a processor and a memory.

Figure 2:
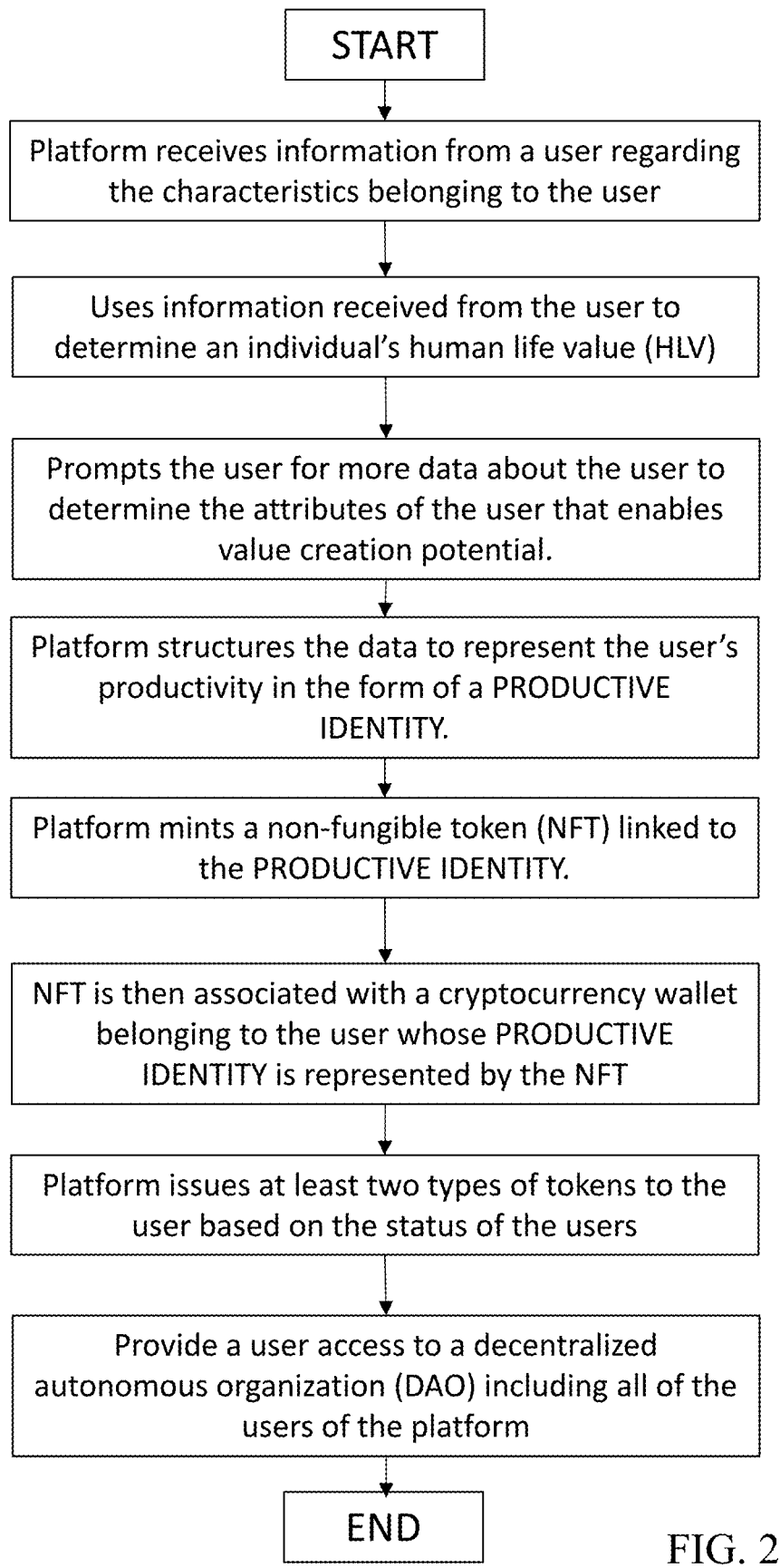
FIG. 2 illustrates a flow chart for a system for generating and trading tokens representative of the value creation potential of an individual.

FIG. 2 illustrates a flow chart for a system for generating and trading tokens representative of the value creation potential of an individual. In one embodiment, the platform, including a server having a processor and a memory, receives information regarding the characteristics belonging to the user account. In one embodiment, the platform is operable to use the information received as input through the GUI and/or from third-party sources to determine a user's QHLV. The platform then prompts for more data to determine the attributes that enable value creation potential. In one embodiment, the platform is operable to further structure the data to represent the user's productivity in the form of a PRODUCTIVE IDENTITY. The platform then mints a NFT linked to the PRODUCTIVE IDENTITY. This NFT is then operable to be associated with a cryptocurrency wallet belonging to the user account represented by the NFT. The platform is further operable to issue at least two types of tokens based on the status of the user account. These tokens include but are not limited to, TALENT tokens and INTRINSIQ tokens. The platform is further operable to provide user accounts access to a decentralized autonomous organization (DAO) including all of the user accounts of the platform.

Quiddity Human Life Value

In one embodiment, the platform is operable to assign a QUIDDITY human life value (QHLV) to a user account. HLV traditionally consists of two components. The two components include existing acquired value and future potential value. Existing value is the pre-existing asset base earned by the use of the existing human life value capability, while the future value is the potential an individual or group of individuals to create new value. While life insurance practices tend to focus on the future value, these policies do not fully consider the potential value through development and collaboration. In contrast, the present invention provides valuation and operational techniques to provide liquidity and grow both the existing acquired value and the potential value components of HLV. This includes all of the attributes and assets that a user currently possesses. By collecting data regarding the traits and attributes of a user, the present invention is operable to provide a valuation for an individual's QHLV. Further, the QHLV is operable to include traditional valuation methods for the future value of individuals in combination with proprietary valuation techniques of the existing value to present a more holistic valuation of HLV.

In one embodiment, the platform determines a value known herein as a QUIDDITY HLV (QHLV) by taking in as input a variety of characteristics belonging to the user including but not limited to, job(s), salary and/or wages, age, gender, lifestyle, planned retirement age, employment benefits, marital status, number of dependents, education, abilities, certifications, assessments, etc. and outputting a monetary value based on such characteristics and attributes. Further, the system is operable to utilize data collected during the creation of the PRODUCTIVE IDENTITY to determine an individual's QHLV. In one embodiment, the QHLV is an estimation of the value of all future income a user is expected to earn until retirement in combination with a proprietary valuation of the existing value of an individual.

Identity Verification

In one embodiment, the platform includes a mechanism operable to identify users as unique humans on the system. This is operable to prevent single users from making multiple accounts on the platform and receiving the financial benefits of being a user multiple times, and also prevents non-human participants from participating on the platform. In one embodiment, a third-party service is implemented to authorize a user as a unique and human user. Alternatively, the process is achieved through a proprietary system.

In one embodiment, identity verification is performed through a third-party Know Your Customer (KYC) service such as but not limited to SHUFTIPRO, SOCURE, JUMIO, UNIT 21, IDENTITYMIND, etc. In another embodiment, identity verification is performed through receiving biometric data (e.g., fingerprint, iris, face sample, etc.) and comparing the biometric data to a known database. From this verification, the platform is operable to assign user accounts with sovereign identities symbolizing the user account is associated with the user whose qualities and attributes are being represented. Additionally or alternatively, other forms of anti-money laundering (AML) techniques are implemented to confirm the identity of the user associated with the user account.

Productive Identity

In one embodiment, the platform associates a productivity identity with a user account based on user input. In one embodiment, the PRODUCTIVE IDENTITY is data representing the details of the value creation attributes of a user. In one embodiment, each user account is represented by an individualized PRODUCTIVE IDENTITY.

In one embodiment, the PRODUCTIVE IDENTITY is operable to be determined from data received about the attributes and/or characteristics. Alternatively, the data used to create the PRODUCTIVE IDENTITY is automatically obtained from one or more third-party sources such as another application (e.g., LINKEDIN), and/or an external database. In such embodiments, one or more application program interfaces (APIs) are operable to be used by the platform to interface and pull data from a third-party source. Alternatively, the platform is operable to include web crawlers, database crawlers, and/or crawlers designed to crawl other sources of data such as a blockchain to obtain data to be used to create the PRODUCTIVE IDENTITYs. In one embodiment, a combination of APIs and crawlers are used to obtain as much data as available to the platform. The remaining information not collected from third-party sources is further operable to be collected by the platform by prompting for the input of the remaining information. Further, the platform is operable to prompt for the confirmation of the data collected from third-party sources and upon a determination that the information is not correct, prompts for input to override the incorrect information through the GUI. The platform is operable to flag conflicting data from multiple sources and enable a selection of the correct data through the GUI. In one embodiment, the system further includes a web crawler to obtain information from third-party sources. This is advantageous as it streamlines the collection and input of information. Alternatively or additionally, validation is performed by third-party subject matter experts (SMEs).

Data used to create a PRODUCTIVE IDENTITY of a user account includes, but is not limited to, knowledge data, behavioral data, values data, relationship data, and/or artifact data. In the present invention, data used to determine the productive identifier is operable to be referred to collectively as Quiddity data. Preferably, artificial intelligence and/or machine learning are implemented when searching third-party data sources to aid in the identification of trends in the data that are associated with certain Quiddity data. Further, natural language processing is operable to be deployed any time text data is being analyzed to identify desirable information for Quiddity data and/or obtain the meaning of the text data in reference to the entirety of the text.

In some embodiments, the PRODUCTIVE IDENTITY further includes a reputation score. A reputation score is a measure of an individual's honesty, character, etc. Advantageously, when combined with an immutable ledger, this highly disincentivizes lying during the creation of the PRODUCTIVE IDENTITY since liars who are caught have a permanently lower reputation score. Alternatively or additionally, validation is performed by third-party subject matter experts (SMEs).

Knowledge data includes, but is not limited to, skills, information, and facts known by the user. In one embodiment, knowledge data is self-reported data obtained from the user. In one embodiment, knowledge data is extracted from examinations administered to the user upon registration. In one embodiment, knowledge data is gathered from third-party sources. In a non-limiting example, the platform is operable to receive input regarding the education of a user. From this input, the platform is operable to determine the degree and/or education history of the user. Upon determination of a degree and/or other education history, the platform is operable to interface with third-party sources such as the website of the educational institution from which the degree was obtained and determine the classes taken to obtain the degree. From the titles of the classes, a list of skills or techniques associated with the classes, or any other information associated with the classes, the platform is operable to determine knowledge data possessed by the user based on the completion of the coursework. Alternatively, the platform is further operable to access one or more syllabuses for courses taken by the user. From the syllabuses, the platform is operable to determine additional knowledge data taught in the courses taken by the user. Alternatively or additionally, knowledge data is operable to be extracted from documents uploaded by a user account such as, but not limited to, a resume, a transcript, etc. In one embodiment, the platform is operable to receive information regarding the language proficiency of the user.

Preferably, knowledge data is determined through a proprietary assessment process administered by the platform through a GUI. The assessment is designed to measure at least one of explicit knowledge, implicit knowledge, and/or tacit knowledge. In one embodiment, explicit knowledge is knowledge that is objective, expressible, and measurable. In one embodiment, implicit knowledge is the application of explicit knowledge. In one embodiment, tacit knowledge is gained from subjective, personal experience, aligning claims with particular knowledge.

Behavioral data includes, but is not limited to, data relating to the motivations and characteristics of a user. In one embodiment, behavioral data includes self-reported data obtained from the user. In one embodiment, behavioral data is obtained through administering a behavioral assessment to the user. Examples of behavioral assessments operable to be implemented to obtain behavioral data include, but are not limited to, the Dominance, Influence, Steadiness, and Conscientiousness (DISC) assessment, the MCODE ASSESSMENT, the CALIPER PROFILE, the California Psychological Inventory, the Gallup StrengthsFinder, the Myers-Briggs Type Indicator, the 16 Personality Factor Questionnaire, and the SHL Occupational Personality Questionnaire. However, a person of ordinary skill in the art will recognize any single or combination of questionnaires and/or assessments is operable to be used to determine behavior data. In one embodiment, the assessment is a proprietary assessment developed for the sole purpose of use in the present invention. Alternatively or additionally, behavior data is operable to be determined from sources such as, but not limited to, data collected by wearable devices (such as smart watches, smart rings, etc.) and/or at least one remote device. In the present invention, a wearable device is any device that is worn by the user associated with a user account that includes at least one sensor and is in network communication with at least one remote device. Behavioral data is further operable to be determined using data relating to a user's behavioral history. Examples of data relating to a user's behavioral history include, but are not limited to, location data history, purchase history, website browsing history, etc. This data is further operable to be modeled to assist in determining behavioral patterns of a user including, but not limited to, work habits throughout the day (e.g., does the user work more in the morning or late in the evening?), times of greatest productivity (e.g., when is the user most on task), focus measurements (e.g., does the user get easily distracted during work tasks), and any other behavior patterns that are operable to be determined over a period of time.

Values data includes, but is not limited to, core values, beliefs, etc. In one embodiment, values data is self-reported data obtained from the user. In one embodiment, values data includes, but is not limited to, rankings of common core values. In one embodiment, values data is extracted from an assessment. In one embodiment, the assessment is the same assessment used to determine behavioral data for a user. Alternatively or additionally, values data is further operable to be determined through analysis of social media accounts associated with a user account. The platform is operable to analyze behavior associated with a user account and determine the value. In a non-limiting example, the platform determines that the social media accounts associated with a user account often posts about doing volunteer work in the community by using a web crawler on the social media pages. From this data, the platform associates values such as caring and community to the platform user account. Further inputs for determining values data include, but are not limited to, an occupation, reviews left by other user accounts regarding the user account of interest, friend accounts, follower accounts, accounts followed by social media accounts associated with the user account, social media or professional groups the user is a part of, etc. Alternatively, religious or political information is extracted from social media profiles or third-party websites, such as religious organization membership directories or voter registration websites. The crawlers of the platform are operable to extract this data along with any other pertinent data, such as local political party platforms, religious organization mission statements or values lists, company mission statements or values lists, values of follower accounts or accounts the user account is following on social media, or any other website or online data source. Preferably, the platform prompts for confirmation of values data automatically determined by the platform before minting the productive identifier. In one embodiment, the platform provides a suggested list of values in the order of probability of the value matching the value of the user account. Alternatively, the data is not operable to be changed by the user account to protect data security and authenticity.

Relationship data includes, but is not limited to, data relating to the existing relationships, network, and/or social abilities of a user. In one embodiment, relationship data is self-reported data obtained from the user. In one embodiment, relationship data is gathered from third-party sources. In one embodiment, the third-party sources include but are not limited to, social media platforms (e.g., FACEBOOK, LINKEDIN, TWITTER, INSTAGRAM, etc.). Additionally or alternatively, data is operable to be collected from third-party datasets such as, but not limited to, college classes, high school graduating classes, employee directories, or any other data sources holding information about a large number of people who have one or more factor in common and are therefore likely to know each other. Further sources of data for relationship data include, but are not limited to, location data. In such embodiments, location data is operable to be collected from a remote device associated with a user account. As the user account is monitored, a record is kept of the user accounts the remote device often is near. These relationships are further operable to be attributed as relationship data to the user account. In further embodiments, relationship data includes relationship scores. A relationship score in the present invention is a measure of the strength and/or trust within a relationship. Advantageously, this allows for stronger relationships to be weighted more heavily than less strong relationships.

Artifact data includes past proof of value creation potential. In one embodiment, this includes, but is not limited to, degrees earned from previous educational experience (e.g., college degree, high school diploma, etc.), credentials, certifications, employment history, past performance reviews, etc. In one embodiment, artifact data is self-reported data obtained from the user account. In one embodiment, artifact data is automatically collected by interfacing with one or more external databases consisting of artifact data. External databases include, but are not limited to, college alumni directories, databases used to manage credentials earned by a user on third-party platforms (e.g., LINKEDIN LEARNING, COURSERA, UDEMY, etc.). Additional or supplemental sources of artifact data include, but are not limited to, social media profiles (e.g., FACEBOOK, TWITTER, INSTAGRAM, etc.), historical and/or governmental records, third-party verification data platforms (e.g., ATLAS CERTIFIED, ACCREDIBLE, etc.), etc.

Preferably, QUIDDITY data determined by the platform that is not self-reported is presented to the user account along with a confidence score. The confidence score is a gauge of the platform's confidence when assigning the QUIDDITY data associated with a user account. In one embodiment, the confidence score is determined based on the artificial intelligence and/or machine learning used to analyze the data sources from where the QUIDDITY data was retrieved and/or determined. In one embodiment, the confidence score is presented, through the GUI, as a measure from 0 to 100, however, any range or number type is operable to be used including, but not limited to, 0-1, 0-10, 0%-100%, etc. In one embodiment, a high score demonstrates high confidence that the QUIDDITY data fits the user account. Preferably, QUIDDITY data presented to the user account through the GUI is above the desired threshold value of confidence score. As a non-limiting example, the platform threshold value for confidence score is 60, therefore only attributes with a confidence score over the threshold are associated with the user account; however, a person of ordinary skill in the art will understand that any number is operable to be assigned as the threshold score.

Preferably, the platform presents at least some of the QUIDDITY data for confirmation by the user account. In one embodiment, only QUIDDITY data with a confidence score within a specific range is operable to be presented for confirmation by the user account. QUIDDITY data with a confidence over this range is not operable to be edited and is automatically incorporated into the productive identifier. This is advantageous as it protects data integrity and prevents altering any data about attributes associated with the user account that are negative, but the platform is highly confident is representative of the user account. Similarly, QUIDDITY data with a confidence score below this range is not operable to be added into the productive identifier.

In one embodiment, the PRODUCTIVE IDENTITY associated with a user account is operable to change over time if there are changes to attributes that affect the data used to create the PRODUCTIVE IDENTITY. Examples of changes that are operable to change a PRODUCTIVE IDENTITY associated with a user account include, but are not limited to, learning a new skill, making new relationships, and/or gaining a new degree.

In one embodiment, data incorporated into the PRODUCTIVE IDENTITY is first verified before it is established as part of the PRODUCTIVE IDENTITY. In one embodiment, data is verified using third-party sources to cross-reference the inputs received by a user account. In one embodiment, data relating to the user account is verified by a second authorized user account.

In a further embodiment, the platform incorporates at least one oracle. An oracle in the present invention is a service that connects smart contracts and other information stored on the blockchain to the physical world. As a non-limiting example, an oracle is operable to be used to certify data used to execute a smart contract contingent on an individual graduating from a certain college. In one embodiment, the oracle utilizes AI to predict the likelihood of information being correct, and certifies information as correct upon a threshold likelihood being reached, such as 95% likely, 90% likely, 85% likely, etc. Oracles implemented by the platform are operable to be non-human or human oracles. More information regarding non-human blockchain oracles is included in US Patent Publication No. 2019/0362068 which is incorporated by reference herein in its entirety. In one embodiment, the at least one oracle implemented by the system is a CHAINLINK oracle or other third-party oracle service. Alternatively, the oracle service is proprietary and developed specifically for the platform.

Quidditar

In a preferred embodiment, user account of the platform are further represented as an icon and/or figure referred to in the present disclosure as a Quidditar. In one embodiment, the Quidditar is a human-like figure rendered in a digital environment, analogous to the concept of an avatar in prior art systems. In one embodiment, the Quidditar is operable to be represented in a metaverse environment. The Quidditar is further operable to include digital attributes to visualize the QUIDDITY data associated with the user account and stored in the PRODUCTIVE IDENTITY. In one embodiment, the Quidditar is a representation of a person associated with a user account in a digital environment. In one embodiment, the Quidditar is a three-dimensional rendering operable to interact with a three-dimensional environment. In an alternative environment, the Quidditar is two-dimensional and is operable to interact with a two-dimensional environment.

Non-Fungible Token

In a preferred embodiment, the platform is operable to mint a non-fungible token (NFT) and assign the NFT to a digital wallet of a user account. In one embodiment, an NFT minted by the platform establishes the PRODUCTIVE IDENTITY as the property of the user account and certifies the authenticity and ownership of the PRODUCTIVE IDENTITY. Unlike prior art NFTs, the NFT establishing the PRODUCTIVE IDENTITY as the property of the user account is untradeable, in one embodiment. In one embodiment, the NFT is made untradeable by limiting write access to the blockchain on which the NFT is minted. In an alternative embodiment, the NFT is made untradeable by ignoring transactions on the blockchain by entities that are not controlled by the central platform.

The PRODUCTIVE IDENTITY is operable to be associated with the NFT through a uniform resource locator (URL) or a content identifier (CID) on the InterPlanetary File System (IPFS). In an alternative embodiment, the PRODUCTIVE IDENTITY is operable to be associated with the NFT through other means of association over a network. If a further alternative embodiment, the NFT is not minted using a distributed ledger, and the information is instead stored in a peer-to-peer distributed hash table or another form of a peer-to-peer database of ID tokens. In such embodiments, write access to the peer-to-peer distributed hash table or another form of a peer-to-peer database is limited to not allow transactions between user accounts. In one embodiment, a PRODUCTIVE IDENTITY is associated with a user account using a central database on the server.

In the event a PRODUCTIVE IDENTITY changes due to changes in the abilities represented in a user account, the PRODUCTIVE IDENTITY is operable to be altered while still being associated with the same NFT, in one embodiment. In an alternative embodiment, a new NFT is minted and transferred to the cryptocurrency wallet associated with the user account and the previous NFT is assigned to a "burn wallet." In such embodiments, a burn wallet is a wallet without a private key pair that is therefore not operable to be accessed by anyone. This mechanism is particularly advantageous when the NFT is associated with the PRODUCTIVE IDENTITY through a CID on the IPFS since files are not operable to be edited after initial posting.

While the NFT is not operable to be sold, the address of the NFT is operable to be listed in a registry of the PRODUCTIVE IDENTITYs and Quidditars known in the present invention as a Quiddipedia. Advantageously, this allows for users to quickly access the value creation capabilities of other members by filtering and sorting the registry. In one embodiment, the Quiddipedia is a database that serves as the only location where identity is able to be edited or deleted from the present system. In one embodiment, the Quiddipedia exists offline to protect the Quiddipedia registry from cyberattacks. In a preferred embodiment, the Quiddipedia is a permissions registry. In such an embodiment, permission must be granted by an owner of the data before data in the registry is operable to be accessed by other user accounts. The Quiddipedia is particularly useful in cases where a user is looking for individuals with certain attributes to partner with for value creation ventures.

Further, the Quiddipedia registry is operable to include other details regarding the user account associated with the NFT. In one embodiment, the Quiddipedia further includes the Productive Identities of each user account of the platform stored in the database.

Tokens

In one embodiment, the platform is operable to issue and support the exchange of at least one cryptocurrency token. In one embodiment, multiple tokens are issued and exchanged over the platform. Advantageously, this allows for tokens representative of different characteristics and with different properties to be used by members to leverage their QHLV. In one embodiment, the tokens issued by the platform include, but are not limited to, INTRINSIQ and TALENT tokens. INTRINSIQ tokens are representative of a member's intrinsic value or value that they possess simply because they are human. In other words, the intrinsic token is an index token; collectively, INTRINSIQ tokens represent a percentage of all HLV that exists on the planet. TALENT tokens are unique to an individual and representative of the value creation potential that a single member has because they have specific HLV-based capabilities and properties. Intrinsic tokens are issued to every user account which registers with the platform of the present invention. In contrast, TALENT tokens are not issued to every user account registered with the platform because TALENT tokens are based on the value that a user associated with an account has to offer based on their individual PRODUCTIVE IDENTITY. TALENT tokens are operable to be issued upon account creation or at any point in time over the lifespan of the account.

In one embodiment, the INTRINSIQ token is an ERC-20 token. In a preferred embodiment, all INTRINSIQ tokens issued by the platform are fungible with any other INTRINSIQ token. In an alternative embodiment, INTRINSIQ tokens are individualized to the DAO member that the token is being issued.

In one embodiment, the INTRINSIQ token is a stablecoin. For purposes of this application, a stablecoin is understood to mean a cryptocurrency that offers price stability by being backed by assets. Accordingly, in one embodiment, the INTRINSIQ token is asset-backed. Preferably, the asset backing the INTRINSIQ token is global HLV assets. In further embodiments, the INTRINSIQ token value is further backed by the PRODUCTIVE IDENTITY of the user. In a further embodiment, the INTRINSIQ token is backed by being underwritten with life insurance policies.

In one embodiment, the INTRINSIQ token is an index token. Index tokens are a class of cryptocurrency tokens that are representative of the value of an entire asset class, not an individual asset. In the case of the present invention, the index token is preferably an index token representative of 30% of the cumulative, global HLV. One of ordinary skill in the art will understand that 30% is not intended to be limiting and other percentages, including 1%, 5%, 10% 15%, 20%, 25%, 35%, 50%, etc., also are operable to be implemented.

In a preferred embodiment, INTRINSIQ tokens are distributed equally and freely to every member of the DAO. In an alternative embodiment, the INTRINSIQ tokens are distributed unequally based on certain factors relating to the individual. In a further alternative embodiment, INTRINSIQ tokens are distributed unequally and randomly to all members of the DAO.

In one embodiment, INTRINSIQ tokens are operable to be backed by 30% of the aggregate of all NFTs representative of PRODUCTIVE IDENTITYs of the member. One of ordinary skill in the art will understand that 30% is not intended to be limiting and other percentages, including 1%, 5%, 10% 15%, 20%, 25%, 35%, 50%, etc., also are operable to be implemented.

In one embodiment, holders of INTRINSIQ tokens are operable to receive a proportion of fees generated by validators validating transactions of native tokens. In one embodiment, the distribution is governed by a smart contract and the amount the INTRINSIQ token holder receives is proportional to the number of INTRINSIQ tokens held in a cryptocurrency wallet.

In a preferred embodiment, INTRINSIQ tokens are locked and are not operable to be traded for a predefined period of time after a user account is created. In one embodiment, this predefined period of time is two years. However, a person of ordinary skill in the art will appreciate that any period time is operable to be set for the predefined time including, but not limited to, one day, one month, one year, ten years, etc. Advantageously, the time the INTRINSIQ token is locked allows for the token to accumulate value and stabilize as members join as well as allow individuals an opportunity to learn about the functions of the INTRINSIQ token before selling it.

In a preferred embodiment, the INTRINSIQ tokens are never able to be sold and are distributed equally to each member of the platform, representing an individual's personhood, and allowing for participation in the DAO. In one embodiment, a second token type (e.g., a liquidity token (LIQUIDDITY)) is distributed equally to each member of the platform and is able to be sold for value, unlike the INTRINSIQ token. This removes the ability for a person to be able to sell their personhood in favor of a more indirect sale.

In one embodiment, TALENT tokens are tokens operable to be optionally issued to any member of the DAO. In one embodiment, it is representative of the individual value creation attributes of a specific potential of a member. In a preferred embodiment, the platform is operable to mint TALENT tokens as ERC-20 tokens specific to each member. Advantageously, this allows for each member's token to be fungible with any other TALENT token of that member, but not fungible with a TALENT token of another member. In an alternative embodiment, TALENT tokens are issued as NFTs.

In one embodiment, TALENT tokens are not only representative of a member's individualized value creation potential but are linked to those abilities through a smart contract.

DECENTRALIZED AUTONOMOUS ORGANIZATION

In one embodiment, the platform further includes a decentralized autonomous organization (DAO). In the case of the present invention, a DAO is a decentralized, member-owned community based on distributed ledger technology. In one embodiment, the DAO acts as an internet-native business collectively owned and managed by its members. More detail about the architecture and functioning of DAOs can be found at (1) Singh, M., & Kim, S. (2019). Blockchain technology for decentralized autonomous organizations. In Advances in Computers (Vol. 115, pp. 115-140). Elsevier.; (2) Law, A. W., Clinical Professor of Law at Benjamin N. Cardozo School of. (2021). The Rise of Decentralized Autonomous Organizations: Opportunities and Challenges. Stanford Journal of Blockchain Law & Policy., each of which is incorporated herein by reference in its entirety. In one embodiment, the DAO is an entity including, but not limited to, a Limited Liability Company, a Trust, a DAO-CoOp hybrid, a Cooperative, or any other form of judicial entity.

In one embodiment, nodes of the DAO are made up of NFTs representative of the PRODUCTIVE IDENTITY. In one embodiment, the DAO is accessed through the application of the remote device. In one embodiment, the DAO represents a network of members of the platform. In one embodiment, the DAO includes a token-based membership model. In token-based membership models, membership is limited via token gating and a DAO member must authenticate that he or she holds the DAO's membership token in their cryptocurrency wallet before they are allowed to enter the DAO network. Token gating allows for a membership that is fixed in size but automatically changes over time as people transfer the tokens. In one embodiment, the token required for membership is the NFT associated with the PRODUCTIVE IDENTITY. In one embodiment, the token required for membership is a native token of the DAO. The NFT associated with the PRODUCTIVE IDENTITY is operable to be required for membership, but a separate native ERC-20 token is implemented into the DAO for purposes of ownership and governance. In such embodiments, anyone having the required NFT in a cryptocurrency wallet is operable to join the DAO, however, only those holding the native tokens are allowed to vote towards alteration to rules, and other changes. Native tokens are also operable to determine ownership of the DAO. In one embodiment, ownership and governance privileges of the DAO increase as the number of native tokens a member holds in a cryptocurrency wallet holds.

In an alternative embodiment, a DAO operates with a fully open membership policy wherein anyone possesses the ability to join the DAO. In an alternative embodiment, every member of the DAO holds equal voting privileges and ownership, and rights are not based on a token.

In a preferred embodiment, anyone with an associated PRODUCTIVE IDENTITY is operable to join the DAO as a member. Members who hold at least one INTRINSIQ token in a cryptocurrency wallet associated with the member are operable to vote on proposals to change the smart contract rules making up the DAO. Proposals are operable to be made by any member of the DAO. In order for a proposal of the DAO to pass, a quorum and/or a minimum number of votes must be reached. In one embodiment, the quorum is greater than 50% of votes. One of ordinary skill in the art will understand that greater than 50% is not intended to be limiting and other percentages, including 1%, 5%, 10% 15%, 20%, 25%, 35%, 50%, etc., also are operable to be implemented. Votes are weighted by the number of INTRINSIQ tokens associated with the cryptocurrency wallet of a voting member. Further, once a vote has been cast by a member holding at least one INTRINSIQ token in an associated cryptocurrency wallet, it is operable to be canceled at any time before a said voting period ends. For a vote to pass, the requirement for quorum and the minimum number of votes must both be surpassed by the end of the voting period. In one embodiment, the length of the voting period is decided by the member of the DAO making the proposal. Alternatively, the length of the voting period is standardized.

Further, native utility tokens are able to be used to transact in the DAO to buy and sell goods, services, etc. within the DAO. Additionally or alternatively, the native utility token is operable to pay for storage and blockchain validations. In one embodiment, the native utility token of the DAO is seen as the currency of the DAO functions. In one embodiment, the native utility token is a separate, fourth type of token, distinct from the INTRINSIQ, liquidity tokens (LIQUIDITY), or TALENT tokens. The utility token is distributed based on participation in and advancement of the DAO, rather than on the individual talent or human life value of the user. In this way, the platform incentivizes active participation in the DAO to continue growing and improving the structure.

The DAO is operable to represent members with their associated PRODUCTIVE IDENTITY. This is advantageous as it allows for members of the DAO to view, on a permission basis, information regarding the value creation potential of other members to encourage members to find other members to collaborate with on value creation ventures. In one embodiment, every aspect of the PRODUCTIVE IDENTITY is available for viewing by other members of the DAO. In one embodiment only select attributes of the PRODUCTIVE IDENTITY are operable to be viewed by other members. In one embodiment, the DAO prompts members to pick and choose what attributes of their PRODUCTIVE IDENTITY.

In one embodiment, the DAO is unique in the nature of the asset which is shared amongst its members. No other DAO provides an environment for sharing HLV-based asset information including the ability to grow the value by allowing searching, matching, and creating whole new forms of value along with allowing access to new education capacities (e.g. lifelong learning), searching, matching, and creating whole new forms of value.

Sub-DAOs

In further embodiments, the platform is operable to support sub-DAOs. In one embodiment, sub-DAOs are decentralized autonomous organizations operable to be formed by groups of members interested in pursuing a value creation venture or other common interests. The sub-DAOs are operable to be controlled by smart contracts incorporating the rules and processes of the sub-DAO. In one embodiment, the smart contracts are a set of generic smart contracts assigned to the sub-DAO by the platform. In one embodiment, aspects of the smart contracts are operable to be edited by the members of the sub-DAO before the sub-DAO is created. Advantageously, this allows the smart contracts to be tailored to specific goals of the sub-DAO. In one embodiment, the sub-DAO includes the same properties and abilities as the main DAO. Similar to how a grid allows individuals to access the power provided by electricity, the DAO and sub-DAOs of the present invention allow individuals to harness HLV-based assets previously intangible to humans by organizing, managing, and delivering these assets by providing a standardized architecture for these assets. Every sub-DAO is operable to be an existing organization, such as a company, a city, or any other group of individuals. The present invention enables every sub-DAO to organize, manage, and deliver their existing HLV-based assets.

In one embodiment, each sub-DAO has approximately the same structure, and is operable to access the Quiddipedia of the present invention. Providing each sub-DAO access to the Quiddipedia facilitates a "plug-and-play" approach for the sub-DAOs, allowing each sub-DAO to update the Quiddipedia with data associated with the sub-DAO in a standardized format that is accessible by other sub-DAOs in a centralized location. This allows sub-DAOs used for different purposes to easily receive up-to-date information as more and more users have their data on the platform.

In one embodiment, the platform allows for the participation of existing institutional entities (e.g., corporations, limited liability companies, etc.) without requiring the existing institutional entities to set up as sub-DAOs within the platform. Instead, in one embodiment, the platform allows for the creation of institution profiles, which operate differently than personal profiles, as they include a distinct dataset (e.g., they do not have personal attributes, but include information such as individual employee names, number of employees, etc.). In one embodiment, the platform verifies an identity of the institutional profile and/or one or more devices setting up the institutional profile as a valid legal agent of the institution. The platform is then operable to provide access to information on the Quiddipedia from one or more sub-DAOs on the platform in association with, by way of example and not limitation, the PRODUCTIVE IDENTITY of individual employees, so as to allow the institution to have a better understanding of the depth of the capabilities and talents of the individual employees. In one embodiment, the platform only provides subsets of information regarding a given person or other items to the institution (e.g., talent information for an employee, but not health information).

Advantageously, a Quiddity Find feature of the present invention allows an individual to communicate their PRODUCTIVE IDENTITY and other features, characteristics, attributes, and abilities of the individual to existing institutional entities and sub-DAOs. In one embodiment, the Quiddity Find feature is a search and match feature which provides for individuals and institutions of the platform of the present invention to be matched based on the PRODUCTIVE IDENTITY and other features, characteristics, attributes, and abilities of the individual and the needs of an institution or sub-DAO. In one embodiment, the present invention provides a digital file to an individual which is downloadable to an electronic device such as a phone or accessible via the electronic device individual. The digital file or a portion of this digital file is operable to be transmitted to an institution or sub-DAO device. The transmission is accomplished using any communication standard known in the art, including but not limited to, near-field communication (NFC), radio frequency (RF) communication, WIFI communication, cellular communication, Internet Protocol (IP) communication, etc. Upon transmission, the digital file is operable to be updated to show the relationship between the individual and institution or sub-DAO. In one embodiment, the digital file is updated to show the time and location of the establishment of the relationship as evidenced by the transmission. The institution or sub-DAO device receives information pertinent to the individual and the standing of the individual from the transmission. In one embodiment, a mobile application of the institution or sub-DAO device is operable to open the digital file or receive the information based on the digital file from the device of the individual. The institution or sub-DAO device is operable to request permission from the device of the individual to provide updates to the digital file of the individual, and is operable to be granted permission to update the digital file of the individual based on actions of the individual in relation to the institution or sub-DAO, or to update a ledger or database associated with the individual on the platform based on actions of the individual in relation to the institution or sub-DAO. In this way, the present invention provides for matching individuals with institutions and sub-DAOs in a manner that provides benefits to both the individual and the institutions and sub-DAOs.

Marketplace

In some embodiments, the platform further includes a marketplace. The marketplace provides user accounts with the ability to buy and sell tokens, services, etc. within the environment of the platform. A number of things are operable to be listed for trade on the platform including, but not limited to, platform tokens, services, property in a platform-based 3D world, accessories operable to be used to accessorize at least one Quidditar, etc.

In one embodiment, the marketplace is operable to process transactions by implementing smart contracts. In one embodiment, a transaction include the transfer of at least one type of token from a cryptocurrency wallet associated with one user account to a cryptocurrency account associated with another user account. In one embodiment, these transactions are stored on a blockchain and validated by at least one validator.

Collaboration Search and Match

By culminating data regarding the productivity of each user account of the platform, the platform is advantageously operable to include a search engine that uses PRODUCTIVE IDENTITYs to perform collaboration searches for members of the DAO to assist in finding other members of the DAO to partake in value creation ventures. This is advantageous as it allows members to connect and collaborate on new value creation ventures. In one embodiment, the search engine implements artificial intelligence (AI) to find members of the DAO whose PRODUCTIVE IDENTITY matches most closely to that requested by a member. Further, the search engine is operable to use Bayesian math and/or Fuzzy logic to match a member's requests with PRODUCTIVE IDENTITYs that have the highest probabilities of matching. Preferably, the request of the member is input through the creation of a word cloud and/or word cloud-like concept. In the present invention, a word cloud is a collection of words in the shape of a cloud wherein the size of the word correlates to the word's importance in the group of words.

Collaboration searches are operable to be carried out by groups of members searching for either one or multiple members to join the group. In one embodiment the word cloud for a search by a group of members is an average of individual word clouds made by each member. In one embodiment, the word cloud for a group of members is a weighted average of individual word clouds that is weighted based on at least one metric. Possible metrics include, but are not limited to, rank, a number of tokens in a cryptocurrency wallet, the amount contributed to a project, etc.

Collaboration searches are further operable to provide members with additional metrics. In one embodiment, the additional metrics include a compatibility score. To determine a compatibility score, the platform compares at least two members' PRODUCTIVE IDENTITYs and predicts whether the members are compatible to work on a value creation venture. In one embodiment, a high score represents a high likelihood that there are at least two members producing an efficient and effective team on a certain project and a low score means a group has a low likelihood of working efficiently together. In an alternative embodiment, a low score means there is a high likelihood of success for the group and a low likelihood of success is represented by a high score. In embodiments wherein the team consists of more than two members, the compatibility score is based on the group as a whole, accounting for all members' scores into the total score. The compatibility score for a team consisting of more than two members is operable to be based on a weighted score. In one embodiment, the weighting of the score is based on the relative contribution of each team member to the project. As a non-limiting example, a team of six members is assembled, but two of the six members are responsible for smaller portions of the project than the other four. Advantageously, the two members who contribute less to the project are weighted lower than the other four when determining the compatibility score. Alternatively, the compatibility score for teams of more than two people is operable to be weighted based on the role of each user account. As a non-limiting example, the team is operable to choose a group leader to play a role similar to that of a CEO of a company. When determining the compatibility score, the system is operable to weight the compatibility score of the group leader with the remaining members of the team higher than the compatibility score of any two other members when determining the team's compatibility score. Advantageously, this increases the accuracy of the compatibility score as each member of the team is likely to work closely with the group leader, but each member isn't as likely to work with any of the other members. Other examples of weighted scoring include, but are not limited to, weighting more highly compatibility scores of members who are assigned the same subprojects or have completed the same subprojects. In one embodiment, the platform is further operable to calculate a compatibility score for every combination of members within the group. This is advantageous as it allows for members to see who is bringing down a group's effectiveness and who should be removed from the group to make a more effective group.

Compatibility scores are operable to be computed using AI/ML. The AI/ML is preferably trained using previously successful and/or unsuccessful teams. The compatibility score is operable to be calculated by using a simple algorithm and is operable to be computed using attributes of the PRODUCTIVE IDENTITYs of each member as inputs. Preferably, the compatibility score is operable to be calculated and/or predicted each time the PRODUCTIVE IDENTITYs of the members represented change. In one embodiment, the compatibility score is further operable to take into account past experiences. For example, the compatibility score is lower if two members of a group had a previous unsuccessful value creation venture. In one embodiment, past experience is based on the success of past ventures that have taken place through the platform. In one embodiment, the platform is operable to access third-party data sources to collect data regarding past experience.

As a non-limiting example of the collaboration search feature, the platform is being implemented by a prolific inventor interested in starting a new value creation venture based on a new invention. In need of a Chief Executive Officer (CEO), Chief Operating Officer (COO), and Chief Financial Officer (CFO) to collaborate with, the application prompts the user account associated with the inventor through the GUI to input a word cloud regarding details about the venture and desirable traits for collaborators. Using the collaboration search engine, the platform receives this input and runs the information input by the user account and information regarding the inventor's PRODUCTIVE IDENTITY against the PRODUCTIVE IDENTITYs of each member of the DAO, and provides the inventor with the top matches for each position. Further, the application is operable to receive additional input from the inventor through the GUI to choose user accounts returned by the search to add the value creation venture team. The platform further determines compatibility scores for each combination of team members and present this information to the inventor through the GUI to aid the inventor in choosing the best team possible for the value creation venture. Additionally, an invite functionality is operable to be included to allow the user accounts to send invitations to other user accounts to join the value creation venture, forming the group.

Opportunity Search and Match

In one embodiment, the platform provides an opportunity search and match function operable to match value creation opportunities with user accounts that have a PRODUCTIVE IDENTITY that aligns with the value creation opportunity or growth opportunity. In one embodiment, an algorithm is operable to process the data included in the PRODUCTIVE IDENTITY to match user accounts with opportunities. In such embodiment, the platform searches resources to find ways of gaining more knowledge in a search and match process. Additionally or alternatively, the platform is operable to match user accounts with value creation opportunities that are highly likely to be of interest to the user. Considering the unique set of data collected and structured in the PRODUCTIVE IDENTITY, the task is not capable of being done anywhere else.

Platform-Based World

In one embodiment, the platform further provides user accounts with access to multiple platform-based worlds. In the present invention, a platform-based universe is a form of an alternate reality where user accounts of the platform are represented as Quidditars and user accounts are allowed to interact with each other and a digital world in a way not possible in the physical world. In one embodiment, the platform-based world allows for user accounts to communicate with each other through methods such as, but not limited to, text chat and/or voice chat. In one embodiment, the platform-based world includes buildings and other forms of digital presences. In one embodiment, the platform-based word further includes listings of digital jobs and projects different user accounts might be interested in to create value. Jobs and projects are operable to compensate a user account through multiple methods, including, but not limited to, platform tokens, native tokens, and/or fiat currency.

In one embodiment, the platform represents each user account in the platform-based world with a Quidditar. In one embodiment, the Quidditar makes visible differing empowering characteristics to other user accounts. In one embodiment, the powers are representative of a PRODUCTIVE IDENTITY associated with a user account.

In one embodiment, the platform-based world is rendered as a three-dimensional landscape operable to support user interaction both with each other and the environment. In one embodiment, the platform-based world is accessed using a virtual reality headset.

Dashboard

In one embodiment, the platform is further operable to display an interactive dashboard through a graphical user interface (GUI) on at least one electronic device. The dashboard is operable to display analytics relating to the personal growth of an individual or collective QHLV. Advantageously, this allows for an individual interacting with the dashboard to receive data operable to aid in the development of self-understanding and self-development of their own QHLV. By providing easy accessibility to this data through a dashboard, a user is operable to know themselves better and see themselves grow. In one embodiment, the data visualized on the dashboard is updated in real-time as the user grows in order to accurately demonstrate the growth to the user. Further, the dashboard is operable to present at least one focal point through the GUI. Focal points are operable to be the highest and best value attributes associated with a user account. By providing focal points to the user, the user is able to focus on developing traits and skills that surround the focal point capabilities to develop even more valuable skills and increase QHLV.

User Flow

Figure 3:
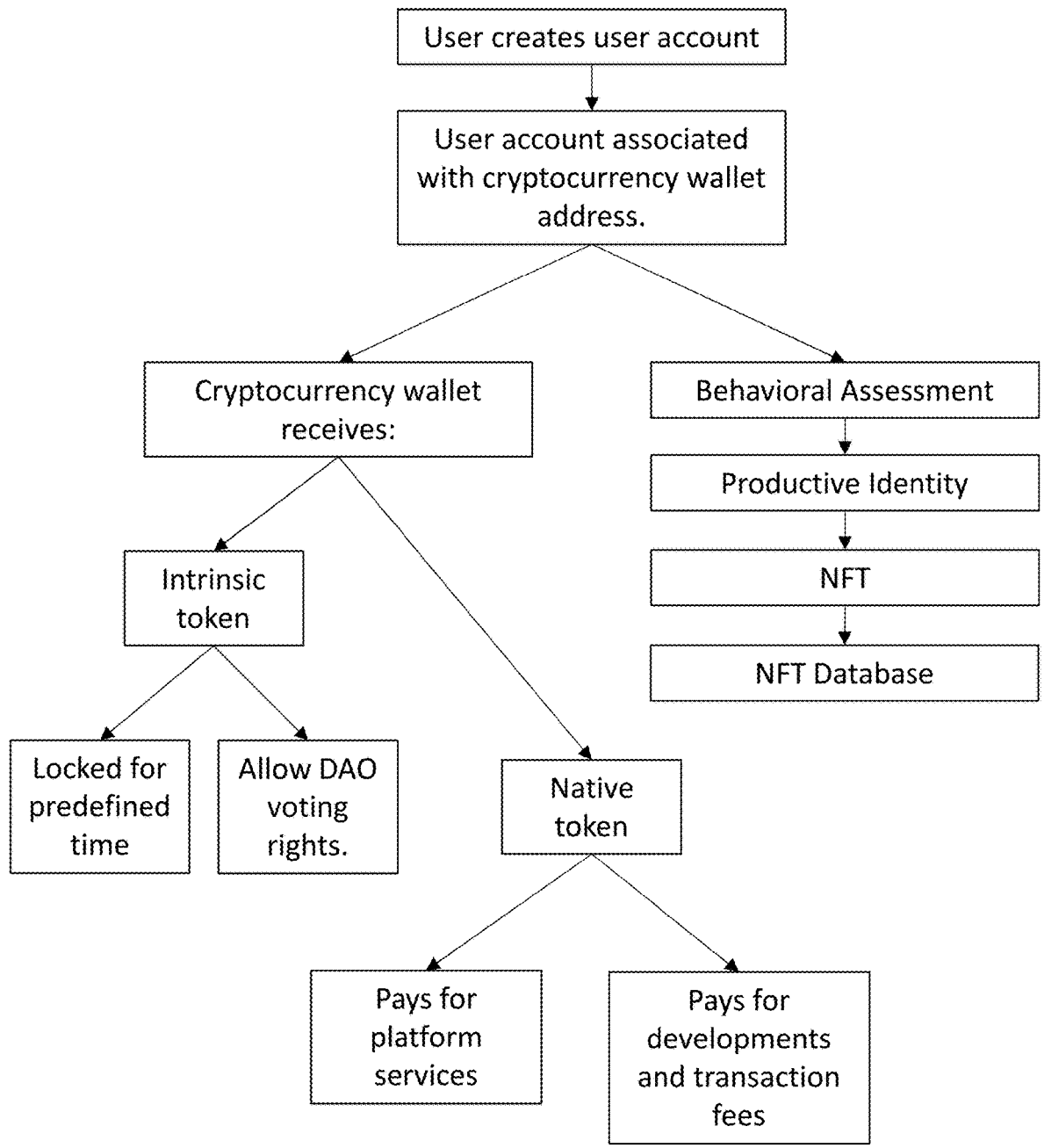
FIG. 3 illustrates a flow chart for a high-level user flow of the present invention.

FIG. 3 illustrates a flow chart for high-level user flow of one embodiment of the present invention. First, a user account is created following the platform receiving a request from a user to join the platform. The user account is then operable to be presented with a behavioral assessment by the platform. After the behavioral assessment is completed, the user account receives reports of the behavioral assessment results and the reports are presented through the GUI. The results of the behavioral assessment and other data representative of the user are then used to create a PRODUCTIVE IDENTITY representative of the user account. The PRODUCTIVE IDENTITY is further operable to be associated with an NFT and stored in a database of NFTs. Then, the user account is assigned a cryptocurrency wallet address that is associated with the user account. Following the assignment of a cryptocurrency wallet address, a predetermined number of INTRINSIQ tokens and native tokens are assigned to the cryptocurrency wallet associated with the new user account. Following the reception of INTRINSIQ and native tokens, the INTRINSIQ tokens are locked for a predefined term while further allowing the user account to participate in voting changes to the DAO. The native tokens are operable to be used for services on the platform and for paying transaction fees.

Figure 4:
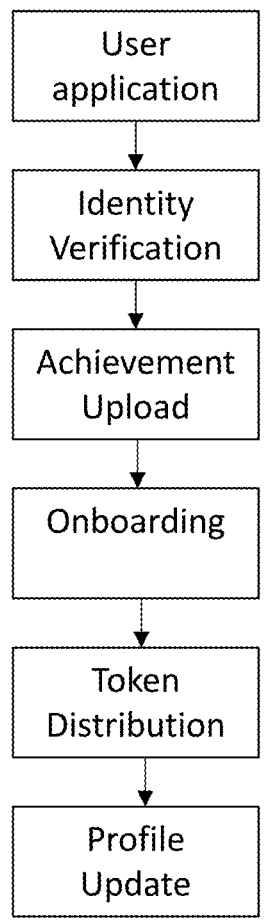
FIG. 4 illustrates a flow chart of an onboarding process of the present invention.

FIG. 4 illustrates a flow chart of the onboarding process of one embodiment of the present invention. First, the platform is operable to receive an application from a user to join the platform. Then, the user's identification is verified using KYC or an alternative form of verification. The platform is then operable to prompt the user to upload documents and other materials and/or data relating to the PRODUCTIVE IDENTITY of the user. The platform then determines if the user account is approved for onboarding, if so, the user account is sent onboarding data. Following successful onboarding, a cryptocurrency wallet associated with the user account receives a predefined number INTRINSIQ and native tokens. The platform is further operable to update a user account as users add certificates, educational documents, and other data relating to the PRODUCTIVE IDENTITY.

AI and Predictive Analytics

The system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Data Stored on a Distributed Ledger

In a preferred embodiment, the platform is operable to store data on a distributed ledger, e.g., a blockchain, acyclic graphs, etc. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art including proof of staked authority. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper *Bitcoin: A Peer-to-Peer Electronic Cash System*, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in *The Business of Blockchain* by William Mougayar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties are operable to verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Cryptocurrency Transactions

Distributed ledger technology further enables the use of cryptocurrencies. A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the *EIP-20: ERC-20 Token Standard*, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet. Alternatively, the present invention is operable to integrate a payments platform that is compatible with cryptocurrency, including, but not limited to, VENMO, PAYPAL, COINBASE, and/or payments platforms associated with financial institutions.

Tokenization

In one embodiment, the platform is operable to tokenize assets. A token is a piece of data that is stored on the distributed digital ledger and that is operable to be used to represent a physical and/or a digital asset, e.g., in a transaction, in an inventory. The token is not the asset itself; however, possession and transfer of the token are stored on the distributed digital ledger, thus creating an immutable record of ownership. In one embodiment, the token includes cryptographic hashes of asset data, wherein the asset data is related to the asset. In one embodiment, the asset data is a chain of data blocks. For example, the asset is a work of digital art, and the asset data includes data about the work such as information about an artist, a subject matter, a file type, color data, etc. The corresponding token includes a cryptographic hash of the asset data, which describes the work. Alternative mappings of the asset data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, *EIP-721: ERC-721 Non-Fungible Token Standard* by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

Figure 5:
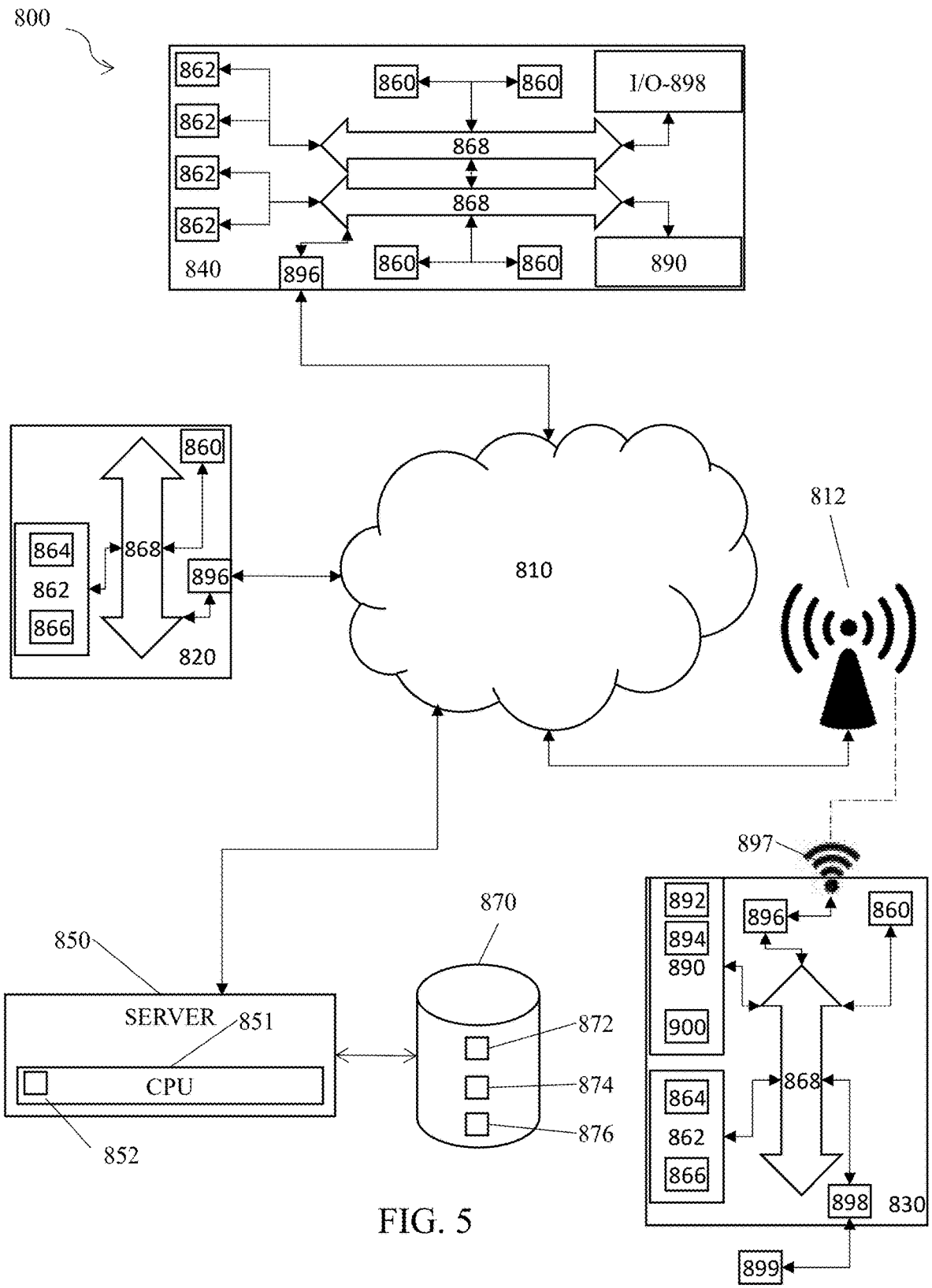
FIG. 5 is a schematic diagram of a system of the present invention.

FIG. 5 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that is operable to perform calculations, process instructions for execution, and/or other manipulations of information.

In another implementation, shown as 840 in FIG. 5, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that is operable to be used to store the computer readable instructions and which is operable to be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 5, is operable to include other components that are not explicitly shown in FIG. 5, or is operable to utilize an architecture completely different than that shown in FIG. 5. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for value creation based on individual future productivity, comprising:
   a server platform, including a processor and a memory, in network communication with at least one user device;
   wherein the server platform is operable to receive personal information concerning at least one user from the at least one user device and/or from at least one external data source;
   wherein the personal information includes education history, employment history, language proficiency, skill proficiency, and/or one or more personal connections, of the at least one user;
   wherein the server platform calculates a human life value for the at least one user based on the personal information received from the at least one user device and/or the at least one external data source;
   wherein the server platform automatically mints at least one non-fungible identity token corresponding to the at least one user, and wherein creation of the at least one non-fungible identity token is recorded on at least one distributed ledger;
   wherein the at least one non-fungible identity token is stored in at least one digital wallet associated with the at least one user; and
   wherein the at least one non-fungible identity token provides membership and voting rights in at least one distributed autonomous organization (DAO).

2. The system of claim 1, wherein the server platform automatically mints one or more talent tokens corresponding to the at least one user based on the calculated human life value.

3. The system of claim 1, wherein the server platform includes a web crawler module operable to automatically retrieve online personal information regarding the at least one user.

4. The system of claim 1, wherein the server platform initiates an application programming interface (API) call to at least one know your customer (KYC) service and/or at least one biometric identity management service to verify an identity of the at least one user.

5. The system of claim 1, wherein the server platform includes at least one database storing the personal information of the at least one user, and wherein the server platform is operable to provide permissions to at least one searching user to access the personal information for one or more requested individuals.

6. The system of claim 1, wherein the server platform includes an artificial intelligence (AI) module configured to automatically search and match the personal information of the at least one user with one or more other users.

7. The system of claim 6, wherein the server platform automatically generates a compatibility score for each of the one or more other users based on similarity between the personal information of the at least one user and the personal information of the one or more other users.

8. The system of claim 1, wherein, based on the personal information, the server platform is operable to generate at least one digital avatar corresponding to the at least one user and render the at least one digital avatar within at least one virtual environment.

9. A system for value creation based on individual future productivity, comprising:
   a server platform, including a processor and a memory, in network communication with at least one user device;
   wherein the server platform is operable to receive personal information concerning at least one user from the at least one user device and/or from at least one external data source;
   wherein the server platform calculates a human life value for the at least one user based on the personal information received from the at least one user device and/or the at least one external data source;
   wherein the server platform automatically mints at least one non-fungible identity token corresponding to the at least one user, and wherein creation of the at least one non-fungible identity token is recorded on at least one distributed ledger;
   wherein the server platform automatically mints one or more talent tokens corresponding to the at least one user based on the calculated human life value;
   wherein the at least one non-fungible identity token is stored in at least one digital wallet associated with the at least one user; and
   wherein the at least one non-fungible identity token provides membership and voting rights in at least one distributed autonomous organization (DAO).

10. The system of claim 9, wherein the server platform includes a web crawler module operable to automatically retrieve online personal information regarding the at least one user.

11. The system of claim 9, wherein the server platform initiates an application programming interface (API) call to at least one know your customer (KYC) service and/or at least one biometric identity management service to verify an identity of the at least one user.

12. The system of claim 9, wherein the server platform includes at least one database storing the personal information of the at least one user, and wherein the server platform is operable to provide permissions to at least one searching user to access the personal information for one or more requested individuals.

13. The system of claim 9, wherein the server platform includes an artificial intelligence (AI) module configured to automatically search and match the personal information of the at least one user with one or more other users.

14. The system of claim 13, wherein the server platform automatically generates a compatibility score for each of the one or more other users based on similarity between the personal information of the at least one user and the personal information of the one or more other users.

15. The system of claim 9, wherein, based on the personal information, the server platform is operable to generate at least one digital avatar corresponding to the at least one user and render the at least one digital avatar within at least one virtual environment.

16. A system for value creation based on individual future productivity, comprising:
- a server platform, including a processor and a memory, in network communication with at least one user device;
- wherein the server platform is operable to receive personal information concerning at least one user from the at least one user device and/or from at least one external data source;
- wherein the server platform includes a web crawler module operable to automatically retrieve online personal information regarding the at least one user;
- wherein the server platform calculates a human life value for the at least one user based on the personal information received from the at least one user device and/or the at least one external data source;
- wherein the server platform automatically mints at least one non-fungible identity token corresponding to the at least one user, and wherein creation of the at least one non-fungible identity token is recorded on at least one distributed ledger;
- wherein the at least one non-fungible identity token is stored in at least one digital wallet associated with the at least one user; and
- wherein the at least one non-fungible identity token provides membership and voting rights in at least one distributed autonomous organization (DAO).

17. The system of claim 16, wherein the server platform initiates an application programming interface (API) call to at least one know your customer (KYC) service and/or at least one biometric identity management service to verify an identity of the at least one user.

18. The system of claim 16, wherein the server platform includes at least one database storing the personal information of the at least one user, and wherein the server platform is operable to provide permissions to at least one searching user to access the personal information for one or more requested individuals.

19. The system of claim 16, wherein the server platform includes an artificial intelligence (AI) module configured to automatically search and match the personal information of the at least one user with one or more other users.

20. The system of claim 19, wherein the server platform automatically generates a compatibility score for each of the one or more other users based on similarity between the personal information of the at least one user and the personal information of the one or more other users.

* * * * *